US009378432B2

(12) United States Patent
Shukla et al.

(10) Patent No.: US 9,378,432 B2
(45) Date of Patent: Jun. 28, 2016

(54) HIERARCHY SIMILARITY MEASURE

(71) Applicant: Adobe Systems Incorporated, San Jose, CA (US)

(72) Inventors: Saurabh Shukla, West Bengal (IN); Vinayak Agarawal, Delhi (IN); Rajan Bhargava, Andhra Pradesh (IN); Shivam Handa, Delhi (IN)

(73) Assignee: Adobe Systems Incorporated, San Jose, CA (US)

( * ) Notice: Subject to any disclaimer, the term of this patent is extended or adjusted under 35 U.S.C. 154(b) by 175 days.

(21) Appl. No.: 14/092,281

(22) Filed: Nov. 27, 2013

(65) Prior Publication Data

US 2015/0149468 A1    May 28, 2015

(51) Int. Cl.
*G06F 17/30* (2006.01)
*G06K 9/00* (2006.01)
*G06K 9/62* (2006.01)

(52) U.S. Cl.
CPC ........ *G06K 9/6219* (2013.01); *G06F 17/30705* (2013.01); *G06K 9/00684* (2013.01); *G06K 9/00724* (2013.01)

(58) Field of Classification Search
CPC .................... G06F 17/30663; G06F 17/30705; G06K 9/6219; G06K 9/00684; G06K 9/00724
USPC .......................................................... 707/740
See application file for complete search history.

(56) References Cited

U.S. PATENT DOCUMENTS

| | | | |
|---|---|---|---|
| 6,363,378 B1 * | 3/2002 | Conklin et al. | |
| 7,308,451 B1 * | 12/2007 | Lamping et al. | 707/737 |
| 8,341,159 B2 * | 12/2012 | Gates | 707/738 |
| 8,990,199 B1 * | 3/2015 | Ramesh et al. | 707/736 |
| 2007/0239707 A1 * | 10/2007 | Collins et al. | 707/5 |
| 2010/0174670 A1 * | 7/2010 | Malik et al. | 706/12 |
| 2011/0225159 A1 * | 9/2011 | Murray | 707/739 |
| 2012/0254188 A1 * | 10/2012 | Koperski et al. | 707/740 |
| 2015/0088862 A1 * | 3/2015 | Umeda | 707/722 |

OTHER PUBLICATIONS

Ganesan, Prasanna et al., "Exploiting Hierarchical Domain Structure to Compute Similarity", *Technical Report. Stanford.* (2001), 34 pages.
Lakkaraju, Praveen et al., "Document Similarity Based on Concept Tree Distance", *ACM 2004*, (2004), 5 pages.

* cited by examiner

*Primary Examiner* — Jorge A Casanova
(74) *Attorney, Agent, or Firm* — Wolfe-SBMC (57) ABSTRACT

Hierarchy similarity measure techniques are described. In one or more implementations, categories in a hierarchy of categories are assigned to each of at least two objects. A similarity score may be calculated for the at least two objects that takes into account the categories assigned to the objects. To compute the similarity score for the objects, a distance in the hierarchy between the categories assigned to the objects may be used. Further, a number of siblings in the hierarchy of the categories assigned to the at least two objects may be used to compute the similarity score for the objects.

20 Claims, 6 Drawing Sheets

402
Assign one or more categories in a hierarchy of categories to each of at least two objects

404
Compute a similarity score for the at least two objects using a distance between the one or more categories assigned to the at least two objects and a number of siblings of the one or more categories assigned to the at least two objects

HIERARCHY SIMILARITY MEASURE

BACKGROUND

Determining a similarity between objects may be useful in many contexts. For example, a determined similarity between objects may be useful to recommend documents or products, to suggest content such as news articles, music, movies, web pages, images, and the like, to compare various sets of data, and so on.

In determining similarity between objects, some conventional techniques employ a hierarchical domain structure that is used to represent the objects. However, the hierarchical domain structure may be utilized in such a way that a measure of similarity determined using these techniques inaccurately reflects the actual similarity between the objects, thus causing these techniques to fail for their intended purpose.

SUMMARY

Hierarchy similarity measure techniques are described. In one or more implementations, categories in a hierarchy of categories are assigned to each of at least two objects. A similarity score may be calculated for the at least two objects that takes into account the categories assigned to the objects. To compute the similarity score for the objects, a distance in the hierarchy between the categories assigned to the objects may be used. Further, a number of siblings in the hierarchy of the categories assigned to the at least two objects may be used to compute the similarity score for the objects.

To the extent that hierarchies are used to determine similarity between two objects, a first and second hierarchy of categories may be formed to represent a first and second object. The hierarchies that are formed to represent the objects, and thus used to determine the similarity between the two objects, may have a same hierarchical structure. To determine the similarity between the first and second object, a similarity score may be computed for first and second hierarchy of categories. The similarity score is based on an effect that each category in the first and second category has on the other categories in the respective first and second hierarchy.

The effect of each category is calculated using a distance factor that measures how much a difference in height between a category and each of the other categories in a hierarchy affects influence of the category. The effect of each category is also calculated using a siblings factor that measures how much a number of siblings of the category affects the influence of the category. In one or more implementations, the effect that each category of a hierarchy has on the other categories of the hierarchy is computed as a vector for the hierarchy. The vector for the hierarchy may then be compared to a vector computed for another hierarchy to determine a similarity between the hierarchies, and also the objects represented by those hierarchies.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Traditional techniques that exploit a hierarchical domain structure to determine similarity between objects may be unsuitable for comparing entire hierarchies that are representative of those objects. For example, some such traditional techniques are restricted to use of weights given to the leaves of a hierarchy. For an object lacking information, however, assignment of such leaf nodes may not accurately represent the object and therefore cause the comparison to be inaccurate. Thus, conventional techniques may fail to leverage the relevance of each node in the hierarchy.

Hierarchy similarity measure techniques are described. In one or more implementations, a similarity is determined between objects. The objects may represent any object between which similarity may be determined, including but not limited to media content (e.g., text, images, movies, music, and so on), users of web services, products, data sets, and so forth. To determine a similarity between objects, hierarchies may be applied to the objects, and the hierarchies compared one to another.

When the objects compared are two written articles, for instance, a hierarchy of categories that corresponds to article topics may be applied to each of the objects. The root category (e.g., root node) of the hierarchy may represent "entertainment" generally. In a level below the "entertainment" category, the hierarchy may include categories that represent "sports" and "movies" as child categories of entertainment. Further, in a level below that the hierarchy may include child categories of the sports category that represent "baseball", "basketball", and "football."

The categories (e.g., nodes) of the hierarchies may be assigned to each of the objects, such as by simply assigning one or more categories of a hierarchy that are related to an object and/or by weighting the categories in the hierarchy based on how relevant those categories are to the object. Based on the hierarchy for article topics given above, for instance, an article about sports generally may be assigned to the sports category while an article about baseball may be assigned to the baseball category of the hierarchy. Since the baseball category is a descendent of the sports category, the baseball article is considered at least somewhat related (and thus similar) to the article about sports generally.

Based on the assignment of categories to an object, an effect that each category has on other categories in a hierarchy may be determined. The effect may be determined as a function of distance between each category and the other categories (e.g., a number of levels in a hierarchy between categories), and as a function of siblings of each category (e.g., a number of categories that descend from a same parent category). The effects of each category in a hierarchy may then be combined to represent the overall hierarchy for the object. The combined effects of a hierarchy for the object may then be compared with the combined effects of another hierarchy for another object to determine similarity of the objects to each other.

The effect that each category has on the other categories may be represented by a relevance vector. The relevance vectors may be combined by taking a weighted sum of the relevance vectors for each category in a hierarchy, resulting in a category vector representative of the overall hierarchy. Accordingly, the category vector of a hierarchy may be compared to category vectors of other hierarchies by applying vector comparison techniques, such as a cosine similarity technique. Application of these techniques may thus be used to indicate a similarity of the vectors and therefore the hierarchies. Given the similarity of the hierarchies, a similarity score may be derived that indicates how similar one object is to another.

Hierarchy similarity measure techniques may be applied to determine similarity in conjunction with Computer Vision, extensible markup language (XML) databases, natural language processing (NLP), compiler optimization, and the like. Additionally, these techniques may be utilized to improve document recommendation, a feature widely used in search engines, product recommendation features of e-commerce websites, news websites, content suggestions, and so on.

In the following discussion, an example environment is first described that may employ the techniques described herein. Example implementation details and procedures are then described which may be performed in the example environment as well as other environments. Consequently, performance of the example procedures is not limited to the example environment and the example environment is not limited to performance of the example procedures.

Example Environment

Figure 1:
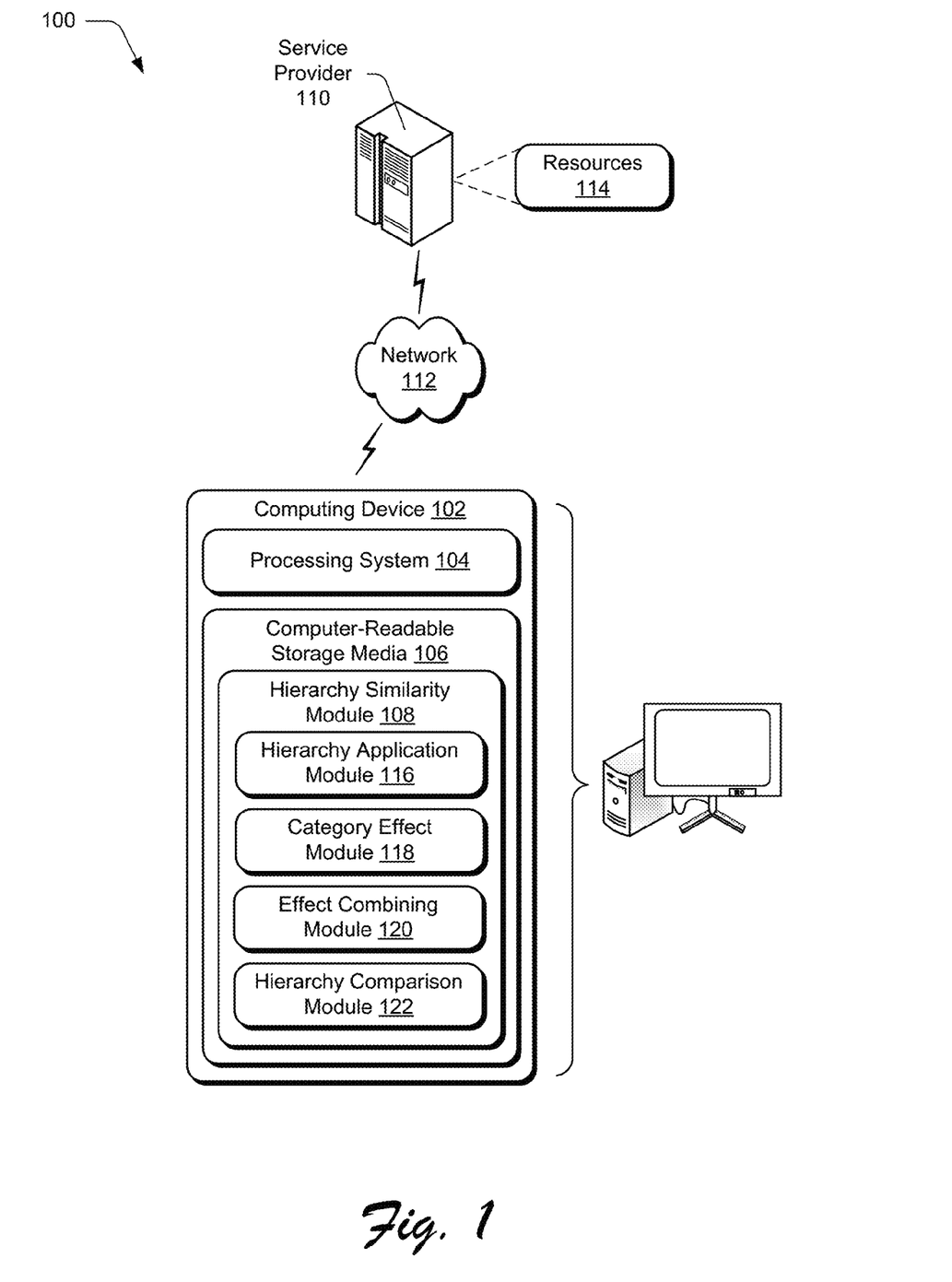
FIG. 1 is an illustration of an environment in an example implementation that is operable to employ techniques described herein.

FIG. 1 is an illustration of an environment 100 in an example implementation that is operable to employ techniques described herein. The illustrated environment 100 includes a computing device 102 having a processing system 104 that may include one or more processing devices (e.g., processors), one or more computer-readable storage media 106, and a hierarchy similarity module 108 embodied on the computer-readable storage media 106 and operable via the processing system 104 to implement corresponding functionality described herein. In at least some implementations, the computing device 102 may include functionality to access various kinds of web-based resources (content and services), interact with online providers, and so forth as described in further detail below.

The computing device 102 may be configured as any suitable type of computing device. For example, the computing device 102 may be configured as a server, a desktop computer, a laptop computer, a mobile device (e.g., assuming a handheld configuration such as a tablet or mobile phone), a tablet, a device configured to receive gesture input, a device configured to receive gestures as input, a device configured to receive speech input, a device configured to receive stylus-based input, a device configured to receive a combination of those inputs, and so forth. Thus, the computing device 102 may range from full resource devices with substantial memory and processor resources (e.g., servers, personal computers, game consoles) to a low-resource device with limited memory and/or processing resources (e.g., mobile music playing devices). Additionally, although a single computing device 102 is shown, the computing device 102 may be representative of a plurality of different devices to perform operations "over the cloud" as further described in relation to FIG. 6.

The environment 100 further depicts one or more service providers 110, configured to communicate with computing device 102 over a network 112, such as the Internet, to provide a "cloud-based" computing environment. Generally speaking, service providers 110 are configured to make various resources 114 available over the network 112 to clients. In some scenarios, users may sign up for accounts that are employed to access corresponding resources from a provider. The provider may authenticate credentials of a user (e.g., username and password) before granting access to an account and corresponding resources 114. Other resources 114 may be made freely available, (e.g., without authentication or account-based access). The resources 114 can include any suitable combination of services and/or content typically made available over a network by one or more providers.

Some examples of services include, but are not limited to, search engine services, e-commerce services, content recommendation services, collaboration services, social network services, blogging services, news services, advertisement services, and so forth. Content may include various combinations of text, video, ads, audio, multi-media streams, animations, images, web documents, web pages, applications, device applications, and the like.

The illustrated hierarchy similarity module 108 includes a hierarchy application module 116, a category effect module 118, an effect combining module 120, and a hierarchy comparison module 122. The hierarchy similarity module 108 and the modules included therein may represent functionality to implement hierarchy similarity measure techniques as described herein. For example, the hierarchy similarity module 108 may be configured in various ways to determine a similarity between various objects, such as between news articles, images, movies, results to a search query, and so on. To do so, the hierarchy similarity module 108 may first employ techniques to apply a hierarchy to each of the objects that are to be compared.

When the objects that are to be compared are two written articles, for instance, a hierarchy of categories that corresponds to article topics may be applied to each of the objects. Take an article about sports generally and another article about baseball, for example. A topical hierarchy having categories that represent "entertainment" may be applied to these two articles. The root category (e.g., root node) of the hierarchy may represent "entertainment" generally. Note that categories may also be referred to and represented as nodes in the following discussion.

In a level below the "entertainment" node (e.g., the second level), the hierarchy may include nodes that represent "sports" and "movies". These categories may be considered children or dependent categories of the entertainment category. Further, in a level below the second level (e.g., the third level), the hierarchy may include nodes that represent "baseball", "basketball" and "football". In this example hierarchy, these categories may descend from the sports node, but not from the movies node. Thus, the article about sports generally may be assigned to the sports node while the article about baseball may be assigned to the baseball node of the hierarchy. Since the baseball node is a descendant of the sports node, the article about baseball is considered at least somewhat related (and thus similar) to the article about sports generally. Further, both articles may be considered related to the entertainment category.

Given application of a hierarchy to each of the objects, the hierarchy similarity module 108 may utilize the hierarchies to compute a similarity score for the objects that are to be compared. In doing so, the hierarchy similarity module 108 determines an effect that each category of a hierarchy has on the other nodes in the hierarchy. This effect is based on how much a distance between a particular category and the other categories in the hierarchy affects influence of the particular category on those other categories. The effect is also based on how much siblings of the particular category affect the influence of that category on the other categories in the hierarchy. Having determined an effect that each category in a hierarchy has on the other nodes in the hierarchy, the hierarchy as it is applied to a first object may be compared to the hierarchy as it is applied to a second object. In this way, a similarity between the hierarchies, and thus the objects, may be ascertained by the hierarchy similarity module 108.

Determining a similarity between objects using a hierarchy similarity measure may be useful in several different contexts. For example, the hierarchy similarity measure techniques described herein may be used to compare images, such as faces. The techniques may also be used to compare and ultimately provide search results. Further, hierarchy similarity measure techniques may be used to recommend content (e.g., movies, music, literature, websites, and so forth) that are determined to be similar to content for which the user has indicated a preference. It should also be readily apparent that similarity between objects may be measured for several other purposes that have not been described herein. Nevertheless, application of hierarchy similarity techniques for purposes other than those described herein does not depart from the spirit and scope of those techniques.

The hierarchy similarity module 108 may be implemented as a software module, a hardware device, or using a combination of software, hardware, firmware, fixed logic circuitry, and so on. Further, the hierarchy similarity module 108 may be implemented as a standalone component of the computing device 102 as illustrated. In addition or alternatively, the hierarchy similarity module 108 may be configured as a component of a web service, an application, an operating system of the computing device 102, a plug-in module, or other device application.

Having considered an example environment, consider now a discussion of some example details of the techniques for hierarchy similarity measures in accordance with one or more implementations.

Hierarchy Similarity Measure Details

Figure 2:
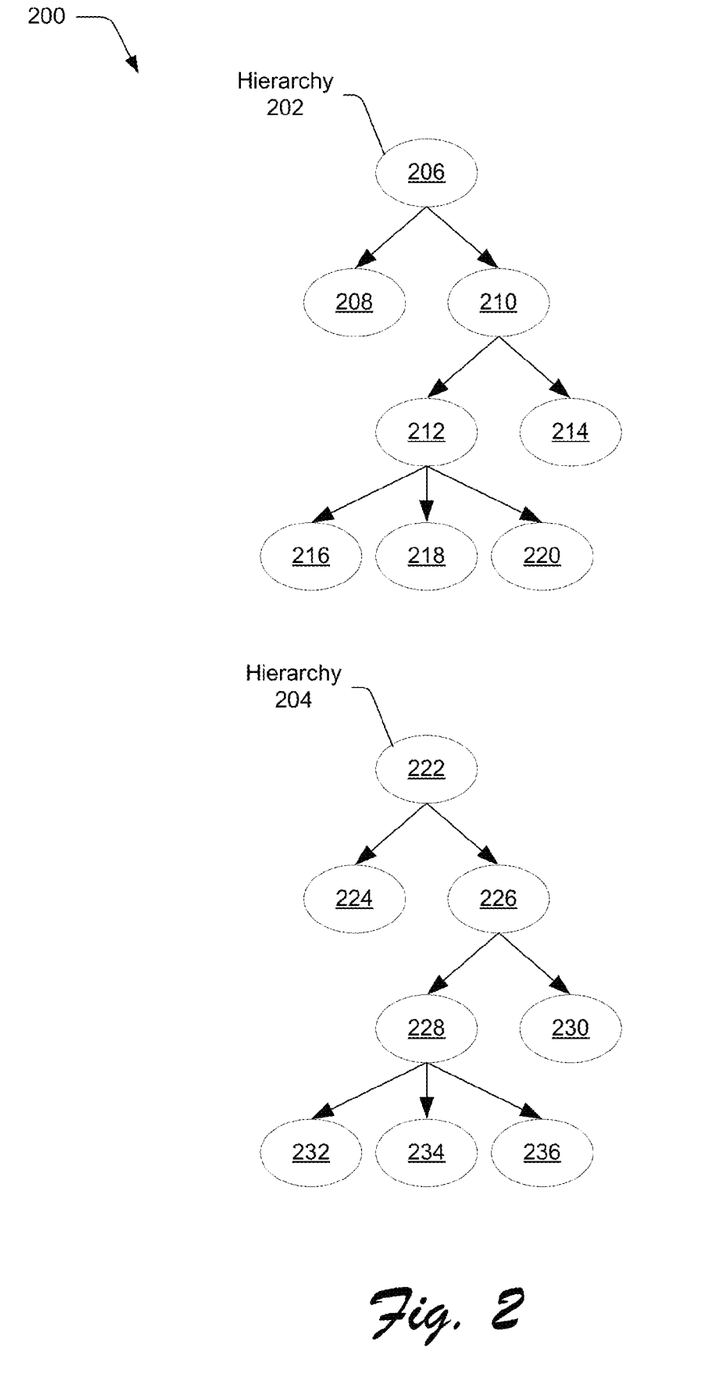
FIG. 2 illustrates example hierarchies that may be utilized to determine similarity between objects represented by the hierarchies through application of the hierarchy similarity measure techniques described herein.

This section describes some example details of hierarchy similarity measure techniques in accordance with one or more implementations. FIG. 2 depicts generally at 200 example hierarchies that may be utilized to determine similarity between objects represented by the hierarchies through application of the techniques described herein.

Hierarchy 202 and hierarchy 204 may be used to represent two objects that are to be compared, such as two articles. Hierarchy 202 includes categories (e.g., nodes) 206, 208, 210, 212, 214, 216, 218, 220 and hierarchy 204 includes categories 222, 224, 226, 228, 230, 232, 234, 236. The top category in a hierarchy is considered the root of the hierarchy, while the other categories are descendants of the root. Thus, category 206 is the root of hierarchy 202, and the other categories 208, 210, 212, 214, 216, 218, 220 are descendants of category 206. Likewise, category 222 is the root of hierarchy 204 and categories 224, 226, 228, 230, 232, 234, 236 are its descendants. It follows then that categories 206, 222 may be considered ancestors of the other nodes in their respective hierarchies.

Regarding the descendants of the category 206, the categories 208, 210 are more specifically classified as the children of category 206. Naturally, category 206 is considered the parent of categories 208, 210. Accordingly, categories 212, 214 are the children of category 210 (and category 210 the parent of categories 212, 214) and categories 216, 218, 220 are the children of category 212 (and category 212 the parent of categories 216, 218, 220).

Continuing with the structure of hierarchies, a given hierarchy includes multiple levels of categories. In the illustrated example, hierarchy 202 has four levels. The first level of hierarchy 202 includes just category 206; the second level includes categories 208, 210; the third level includes categories 212, 214; and the fourth level includes categories 216, 218, 220. Just as the first level of hierarchy 202 includes just category 206, the first level of a given hierarchy includes but a single node (the root node). Levels relate to parent-child relationships such that a child category is one level below its parent while a parent category is one level above its child.

Categories that are the children of a particular category may be related to the particular category as sub-categories. For example, if hierarchy 202 were to represent news article topics and category 212 represented the topic "sports" generally, then categories 216, 218, 220 could represent the topics "baseball", "basketball", and "football". Thus, baseball, basketball, and football may be considered sub-categories of the topic sports. The child of a particular node represents a category that is more specific than that represented by the particular node. Said another way, children of a particular category represent categories having a greater degree of granularity than the particular category. Although baseball, basketball, and football each relate to the topic of "sports", for instance, the categories also correspond to topics that are more specific (have a greater degree of granularity) than just "sports".

Categories that descend from a same parent category are considered siblings. Thus, categories 216, 218, 220 are siblings, one to another. Siblings generally represent categories having a similar degree of granularity. As a hierarchy is traversed from top to bottom, the categories at lower levels represent a greater degree of granularity than those at higher levels. Continuing with the above example, the categories baseball, basketball, and football each have a similar level of granularity relative to one to another, e.g., they are specific sports. Relative to the topic sports, however, baseball, basketball, and football are more granular. Further, a category representing a specific baseball team may correspond to an even greater degree of granularity. As such, a category representing a specific baseball team is not likely to be included at the same level as categories representative of simply baseball, basketball, and football.

Rather, if a category representing a specific baseball team were to be included in hierarchy 202, then another level could be introduced into the hierarchy (not shown). This added level would represent an even greater degree of granularity. For example, hierarchy 202 could be made to include a fifth level of categories that descend from the categories baseball, basketball, and football. The categories of the hypothetical fifth level that descend from baseball, basketball, and football could represent specific teams that play those sports. For example, the category representing baseball could have child nodes that represent the New York Yankees, the Boston Red Sox, and so on, while the category representing basketball could have child nodes that represent the New York Knicks, the Boston Celtics, and so on.

In any case, it should be noted that in the illustrated example hierarchy 202 and hierarchy 204 have a same hierarchical structure. In other words, hierarchies 202, 204 have a same number of categories (eight), a same number of levels (four), a same number of categories at each level, corresponding categories have a same number of descendants and children (e.g., categories 212, 228 each have three children), and so on. In one or more implementations, the hierarchies used to represent objects that are to be compared, one to another, have a same hierarchical structure. It should also be noted that hierarchies 202, 204 are merely examples of hierarchies used to compare objects, and that hierarchies having a different structure than hierarchies 202, 204 may be used without departing from the spirit and the scope of the techniques described herein.

As mentioned above, determining a similarity between objects using hierarchy similarity measure techniques may be useful in several different contexts, such as to compare images. Accordingly, hierarchies may be formed to determine a similarity between objects for those several different contexts. To determine similarity between images including faces, for example, hierarchies used to determine a similarity between faces may be formed. In determining a similarity between faces, a hierarchy may be formed such that the root category represents a face generally, its children represent skin, eyes, ears, nose, mouth, and so on. Further, the children of the eyes category may represent shape, color, relative location, and so forth. Although such a hierarchy is merely an example, it indicates how hierarchies may be formed to compare a variety of other objects, such as search results, content items, including music (e.g., by genre and/or by audio profile), members of a social network (e.g., using metadata extracted from the social network), credit profiles, financial instruments, and so on. Clearly, these are merely examples of objects for which hierarchies may be formed and used to compare those objects. It should be appreciated therefore that hierarchies may be formed to compare various other objects without departing from the scope of hierarchy similar measure techniques.

Figure 3:
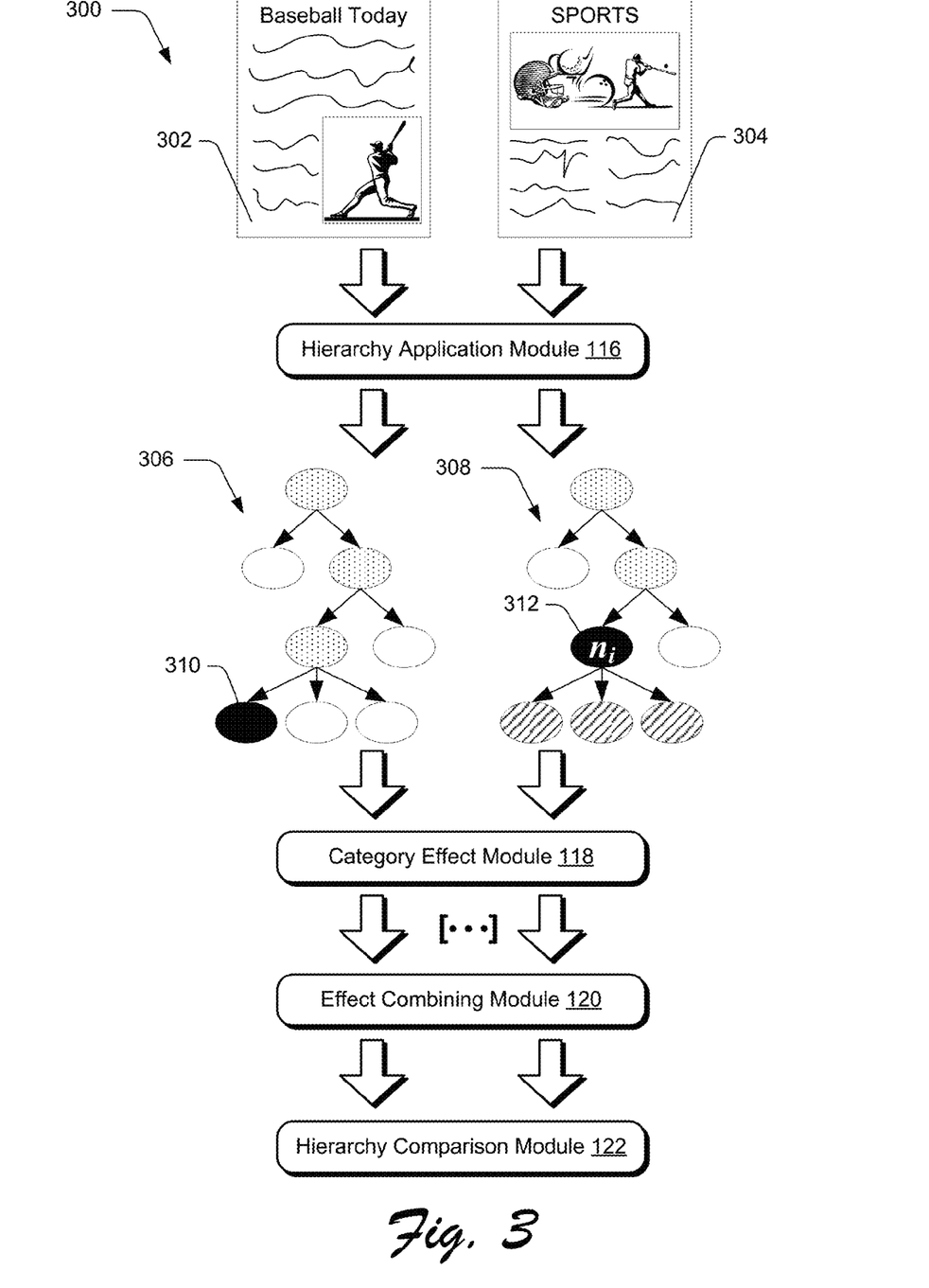
FIG. 3 illustrates portions of the environment from FIG. 1 in conjunction with data on which those portions perform operations in accordance with one or more implementations.

FIG. 3 depicts generally at 300 some portions of the environment 100 of FIG. 1, but also includes data on which those portions perform operations in accordance with one or more implementations. In particular, FIG. 3 depicts from the environment 100 the hierarchy application module 116, the category effect module 118, the effect combining module 120, and the hierarchy comparison module 122 of the hierarchy similarity module 108. In addition, FIG. 3 depicts objects 302, 304 and hierarchies 306, 308, which may correspond to hierarchies 202, 204 of FIG. 2.

In general, the hierarchy application module 116 represents functionality to apply hierarchies to objects that are to be compared. Hierarchy application module 116 may be configured to generate or form hierarchies to determine a similarity between those objects. For example, if objects 302, 304 correspond to articles that are to be compared, hierarchy application module 116 may form a hierarchy of article topics to determine a similarity between the articles, such as hierarchies 306, 308.

Once formed, hierarchy application module 116 may apply the hierarchies 306, 308 to the objects 302, 304. To do so, hierarchy application module 116 may assign one or more of the categories in a hierarchy to each of the objects for which similarity is to be determined. This may include weighting the categories of the hierarchy that are assigned to an object according to how relevant those categories are to the object. Assume for example that hierarchy 306 corresponds to hierarchy 202, hierarchy 308 corresponds to hierarchy 204, these hierarchies are comprised of categories representing article topics, and they may be used to compare objects 302, 304, which in this example correspond to articles. Further, the categories of hierarchies 202, 204 may be representative of article topics as follows: categories 206, 222 of news; categories 208, 224 of business; categories 210, 226 of entertainment; categories 212, 228 of sports; categories 214, 230 of movies; categories 216, 232 of baseball; categories 218, 234 of basketball; and categories 220, 236 of football. Given the correspondence of hierarchies 306, 308 to hierarchies 202, 204, node 310 of hierarchy 306 may correspond to the baseball category 216 of hierarchy 202 and node 312 of hierarchy 308 may correspond to the sports category 228 of hierarchy 204.

In the illustrated example, object 302 includes the heading "Baseball Today" and object 304 includes the heading "SPORTS". Accordingly, object 302 may be an article determined to be about baseball, and object 304 may be an article determined to be about sports generally. There are several methods that may be used to determine what these articles are about, including using natural language processing (NLP) techniques, a "bag-of-words" approach, extracting and parsing metadata of objects 302, 304, and so on.

In any case, hierarchy application module 116 may apply the categories of hierarchy 202 to object 302 such that object 302 is assigned to category 216 (baseball). According to the structure of hierarchy 202, object 302 is also related through its ancestry to category 212 (sports), category 210 (entertainment), and category 206 (news). In one or more implementations, hierarchy application module 116 may also assign those categories to object 302 since they are related through ancestry to category 216. In a similar fashion, hierarchy application module 116 may apply the categories of hierarchy 204 to object 304 such that object 304 is assigned to category 228 (sports). Based on the ancestry of category 228, object 304 is also related to category 226 (entertainment), and category 222 (news). These related categories may also be assigned to object 304 by the hierarchy application module 116 in various implementations.

Additionally or alternately, hierarchy application module 116 may access pre-formed hierarchies from storage (e.g., a library or database of hierarchies), and apply the already-formed hierarchies to the objects for which similarity is to be determined. The already-formed hierarchies may be stored locally to the hierarchy application module 116, such as at the computer-readable storage media 106 of the computing device 102. The already-formed hierarchies may also be stored remotely from the hierarchy application module 116, such as at one of the service providers 110 and simply made accessible to the hierarchy application module 116.

Given application of the hierarchies to the objects for which similarity is to be determined, a similarity score between the hierarchies (and thus the objects) may be calculated. To do so, the category effect module 118 may determine an effect of each node in a given hierarchy on the other nodes in the hierarchy. The effect of a particular node on the other nodes may be calculated as a function of that node's distance in the hierarchy from the other nodes and a number of siblings of that node.

Using the hierarchy as article topics example, the baseball category 216 of hierarchy 202 may influence or be influenced more by the sports category 212 than the entertainment category 210 based on its distance from those other categories. In this example, the baseball category 216 has two siblings (e.g., the basketball category 218 and the football category 220). It is assumed that each of these categories influences the sports category 212 equally. Consequently, the baseball category 216 represents one third (⅓) of the influence exerted on the sports category 212 by its children categories. If additional categories were added to hierarchy 202 as children of the sports category to represent additional sports though, the influence of the baseball category 216 would be less. For example, if two additional nodes representing cricket and golf were added to hierarchy 202 as children of the sports category 212, the baseball category 216 would then represent one fifth (⅕) of the influence exerted on the sports category 212 by its children.

To calculate the effect of each node as a function of its distance from the other nodes and as a function of its siblings, the category effect module 118 may compute a vector for each node. Specifically, the category effect module 118 may compute a relevance vector for each node, which is a measure of how a node influences the other nodes in the hierarchy. In computing the relevance vector, each node of the hierarchy may be considered a separate vector in vector space.

Given a hierarchy (H) with nodes labeled $n_i$, i ranges from 1 to n and n is the number of nodes in the hierarchy. The relevance vector (RV) for each node is defined as:

$$RV(n_i) = \Sigma_j r(n_i, n_j) \cdot \hat{n}_j$$

The function $r(n_i, n_j)$ is defined as the relevance of node i to node j, and measures the effect of change in weight of i on j's final weight. The function $r(n_i, n_j)$ may be enumerated as follows:

If $n_j$ is $n_i$, then $r(n_i, n_j) = 1$;
If $n_j$ is a descendant of $n_i$, then $$r(n_i, n_j) = \frac{1}{siblingFactor(n_j)} \cdot distanceFactor(n_i, n_j);$$

and
If $n_j$ is an ancestor of $n_i$, then $$r(n_i, n_j) = \frac{1}{siblingFactor(n_i)} \cdot distanceFactor(n_i, n_j).$$

The sibling factor measures how much a number of siblings affect the influence of a given node, and is defined as follows:

$$SiblingFactor(n_i) = \Sigma_{k=0}^{|siblings(n_i)|} \beta^k \text{ where } 0 < \beta < 1$$

The distance factor measures the effect of a difference in height between a given node and another node in the hierarchy H, and is defined as follows:

$$DistanceFactor(n_i, n_j) = \alpha^{|depth(ni) - depth(nj)|} \text{ where } 0 < \alpha < 1$$

Having ascertained the effect of each category in the hierarchy (e.g., the relevance vector of each node), the effect combining module 120 may combine the effects. To do so, the effect combining module 120 may compute a category vector for the hierarchy that represents a weighted sum of the relevance vectors computed for each category of the hierarchy. The category vector is a one-dimensional vector that is obtained for a single hierarchy with a number of dimensions equivalent to a number of nodes in the hierarchy. The category vector (CV) is defined as follows:

$$CV(T) = \Sigma_i (RV(n_i) \cdot w_{n_i} \cdot d_{n_i})$$

Here, $w_{n_i}$ is the weight assigned to $n_i$, and $d_{n_i}$ is the global depth factor of $n_i$, which is defined as follows:

$$d_{n_i} = \frac{\sum_{k=0}^{depth(n_i)} \gamma^k}{\sum_{k=0}^{maxDepthPath(n_i)} \gamma^k}$$

The global depth factor, $d_{n_i}$, is used because similarity at a greater depth in a hierarchy carries more weight than similarity at a lesser depth in the hierarchy, e.g., having similarity with an article about baseball is more specific than having similarity with an article about sports given the example hierarchy discussed above. The maxDepthPath of a given node represents the length of the path through the hierarchy in which the given node is included that has the greatest depth. The length of this path may be used to normalize the global depth factor since it accounts for levels in the hierarchy below the given node.

In addition, the parameters, β (used to calculate the sibling factor), α (used to calculate the distance factor), and γ (used to calculate the global depth factor) may be adjusted to vary an amount that the siblings, the distance, and global depth factor, respectively, each influence a similarity between hierarchies. For example, if it is determined that the siblings factor is to be given greater or lesser importance than the distance factor and the global depth factor, a value of β may be adjusted accordingly.

Once the effects of each category in at least two hierarchies are combined, the hierarchy comparison module 122 may perform a comparison between the at least two hierarchies. In doing the comparison, the hierarchy comparison module 122 may determine a similarity between the at least two hierarchies, and also therefore between the objects that those hierarchies represent. The similarity determined by the hierarchy comparison module 122 may be given in the form of a score, such as 0-100, where a score of zero indicates that the objects are not similar at all and a score of 100 indicates that the objects are the same. It should be appreciated that a similarity between at least to objects may also be expressed in other ways without departing from the scope of the techniques described herein.

In one or more implementations, the hierarchy comparison module 122 is configured to compare category vectors that are computed for hierarchies representing objects that are to be compared. Using vector comparison techniques, the hierarchy comparison module 122 may compare the category vectors to determine a similarity of the hierarchies and thus the objects that those hierarchies represent. For example, the hierarchy comparison module 122 may employ vector comparison techniques such as a cosine similarity technique to determine a similarity between the hierarchies. Conventional techniques that exploit hierarchical domain structure, however, merely compare the nodes of a hierarchy that are determined to represent the objects rather than the hierarchies as a whole. In contrast to conventional techniques, hierarchy similarity measure techniques compare the overall hierarchies by comparing the category vectors computed for those hierarchies.

Additionally, hierarchy similarity measure techniques are applicable independent of nodes to which weights are assigned, e.g., the weights could be assigned leaf or non-leaf nodes. Using hierarchy similarity measure techniques, the weights given to the nodes at each level of a hierarchy are normalized. Consequently, when a majority of nodes applied from hierarchies to compare objects are similar but one or more pairs of nodes are different, the effect of the similar nodes is not skewed. Using conventional approaches, however, a large change in a similarity score may result when one pair of nodes is different even though a majority of the nodes are similar, such as when the differences occur at leaf nodes.

Having discussed example details of the techniques for hierarchy similarity measure, consider now some example procedures to illustrate additional aspects of the techniques.

Example Procedures

This section describes example procedures for hierarchy similarity measure techniques in one or more implementations. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In at least some implementations the procedures may be performed by a suitably configured device, such as the example computing device 102 of FIG. 1 that makes use of a hierarchy similarity module 108.

Figure 4:
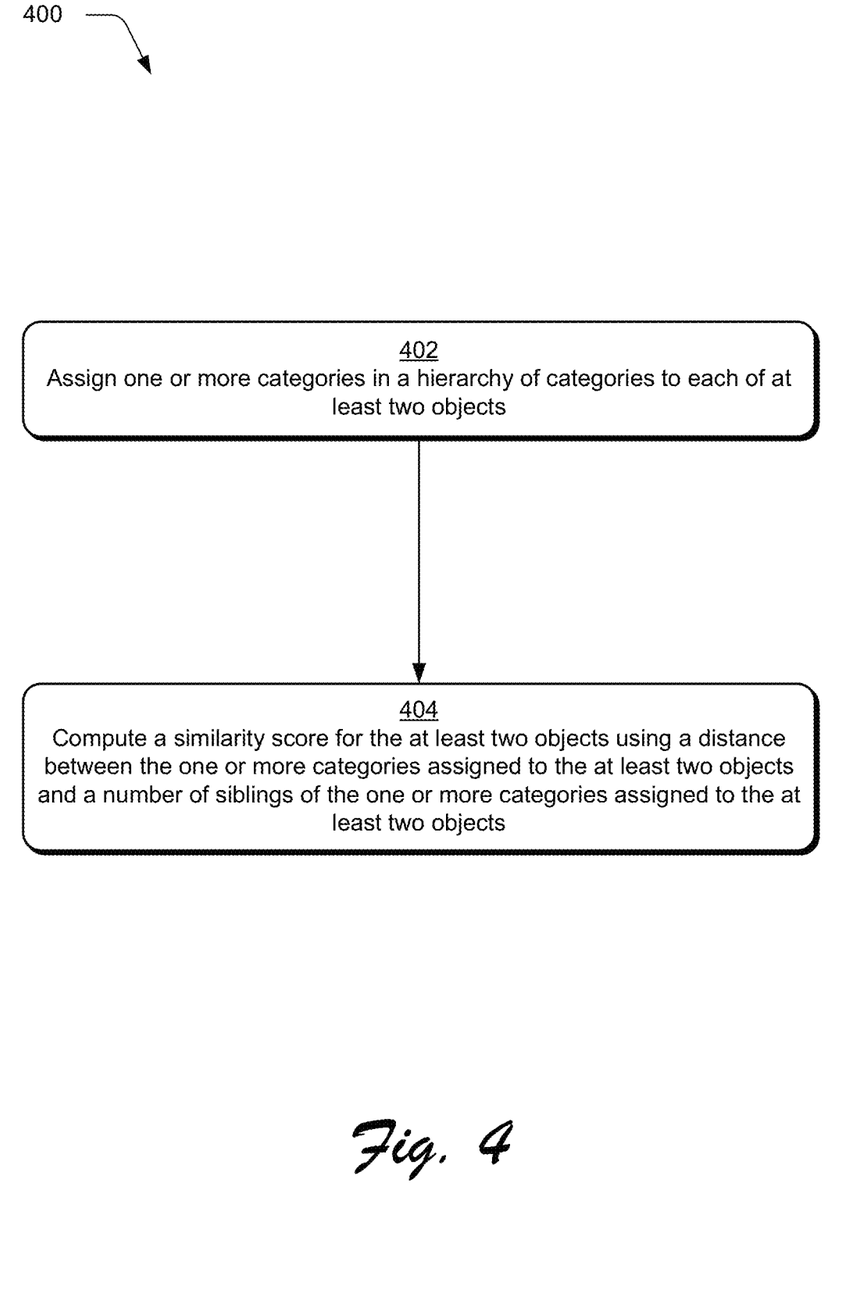
FIG. 4 is a flow diagram depicting a procedure in an example implementation in which one or more categories in a hierarchy of categories are assigned to each of at least two objects.

FIG. 4 depicts an example procedure 400 in which a similarity is determined for at least two objects using hierarchies of categories. To do so, one or more categories in a hierarchy of categories are assigned to each of the at least two objects (block 402). For example, the hierarchy application module 116 may assign one or more categories of hierarchy 306 to object 302 and one or more categories of hierarchy 308 to object 304. The hierarchy application module 116 may also form hierarchies 306, 308 for respective objects 302, 304. Regardless of whether hierarchy application module 116 merely assigns the categories of hierarchies 306, 308 to the objects 302, 304 or forms those hierarchies and then assigns the categories to the objects, hierarchies 306, 308 have a same hierarchical structure.

Given the assignment of the categories in a hierarchy to each of the at least two objects, a similarity score may be computed for the at least two objects (block 404). In computing the similarity score, a distance in the hierarchy between the one or more categories that are assigned to the at least two objects may be used. For example, the category effect module 118 may compute an effect that an assigned category in hierarchy 306 has on the other categories in the hierarchy. The category effect module 118 may do so, in part, as a function of a distance between the assigned category and the other categories in the hierarchy 306.

Further, a number of siblings in the hierarchy of the one or more categories assigned to the at least two objects may be used to calculate the similarity score for the at least two objects. For example, the category effect module 118 may compute the effect that an assigned category in hierarchy 306 has on the other categories in the hierarchy, in part, as a function of a number of siblings of the assigned category. Accordingly, the distance and the number of siblings used to compute the similarity score for the at least two objects are determined individually for each object using a respective tree (e.g., for object 302, the distance between the nodes and the siblings of the nodes are determined using solely hierarchy 306).

The effect ascertained for each category in hierarchy 306 may then be combined and the effect ascertained for each category in hierarchy 308 may also be combined. The combined effects of the categories in hierarchy 306 may then be compared to the combined effects of the categories in hierarchy 308. Based on the comparison, a measure of similarity between hierarchies 306, 308 may be determined and a similarity score derived that represents how similar object 302 is to object 304.

Figure 5:
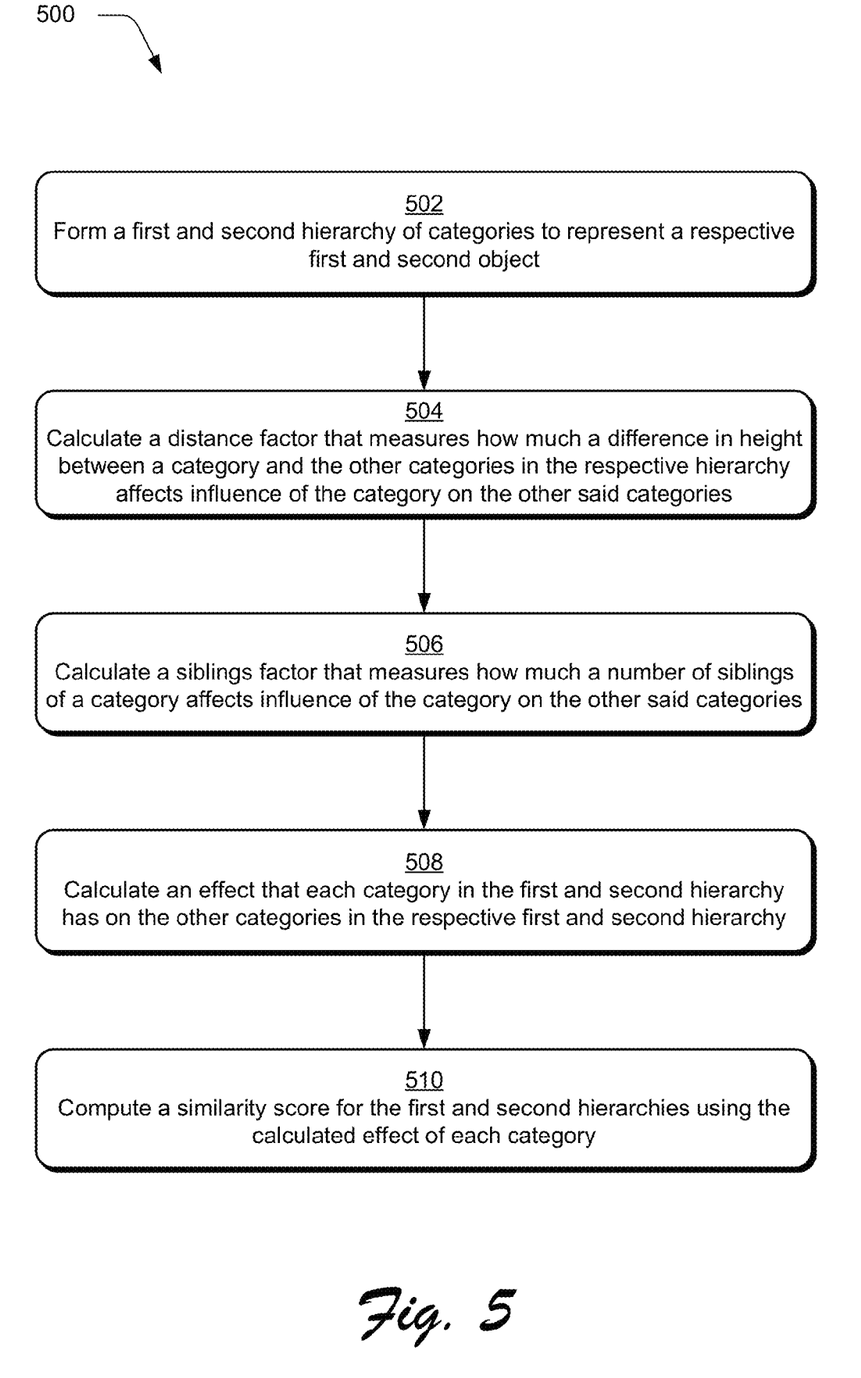
FIG. 5 is a flow diagram depicting a procedure in an example implementation in which a first and second hierarchy of categories are formed to represent a first and second object.

FIG. 5 depicts an example procedure 500 in which hierarchies are formed to represent objects and from which a similarity score may be computed to determine a similarity of the objects. A first and second hierarchy of categories may be formed to represent a respective first and second object (block 502). For example, the hierarchy application module 116 may form hierarchies 306, 308 to represent objects 302, 304 respectively.

For each category in a hierarchy, a distance factor may be calculated that measures how much a difference in height between the category and the other categories in the hierarchy affects influence of the category on the other categories (block 504). Given the hierarchy 202, for instance, the category effect module 118 may calculate how much a difference in height between category 216 and the other categories in the hierarchy affects the influence of category 216 on those categories.

A siblings factor may also be calculated for each category in a hierarchy that measures how much a number of siblings of the category affects influence of the categories on the other categories in the hierarchy (block 506). For example, the category effect module 118 may calculate how much a number of siblings of category 216 affects the influence of category 216 on the other categories in hierarchy 202.

Based on the distance and siblings factors, an effect that each category in the first and second hierarchy has on the other categories in the respective first or second hierarchy may be calculated (block 508). For example, the category effect module 118 may calculate a distance factor and a siblings factor for each of categories 206, 208, 210, 212, 214, 216, 218, 220 relative to the others. Based on the distance and siblings factors calculated for each of the categories, the category effect module 118 may calculate an overall effect that each of the categories 206, 208, 210, 212, 214, 216, 218, 220 has on the others. The effect of each of the categories 206, 208, 210, 212, 214, 216, 218, 220 may be represented as a relevance vector, indicative of how relevant a category is to each of the other categories.

Using the calculated effect of each category in the first and second hierarchies, a similarity score may be computed to determine a similarity between the first and second object (block 510). For example, the effect combining module 120 may combine the effect that each category of hierarchy 306 has on the other categories in that hierarchy. To do so, the effect combining module 120 may combine relevance vectors computed for each of the categories of hierarchy 306. Specifically, the combining may be performed by taking a weighted sum of the relevance vectors computed for hierarchy 306. The combining may be effective to derive a category vector for hierarchy 306. In a similar fashion, the effect combining module 120 may combine the effect that each category of hierarchy 308 has on the other categories in that hierarchy. Thus, a category vector for hierarchy 308 may also be derived.

Given the category vectors for hierarchies 306, 308, hierarchy comparison module 122 may employ vector comparison techniques to determine a similarity between those vectors. Since the category vectors represent each of hierarchies 306, 308 as a whole, the similarity between the vectors may indicate a similarity between the hierarchies 306, 308. In turn, the similarity between the hierarchies 306, 308 may also indicate a similarity between the objects that those hierarchies represent. The vector comparison techniques may be effective to derive a score that indicates how similar the object represented by hierarchy 306 is to the object represented by hierarchy 308.

Having described example procedures in accordance with one or more implementations, consider now an example system and device that can be utilized to implement the various techniques described herein.

Example System and Device

Figure 6:
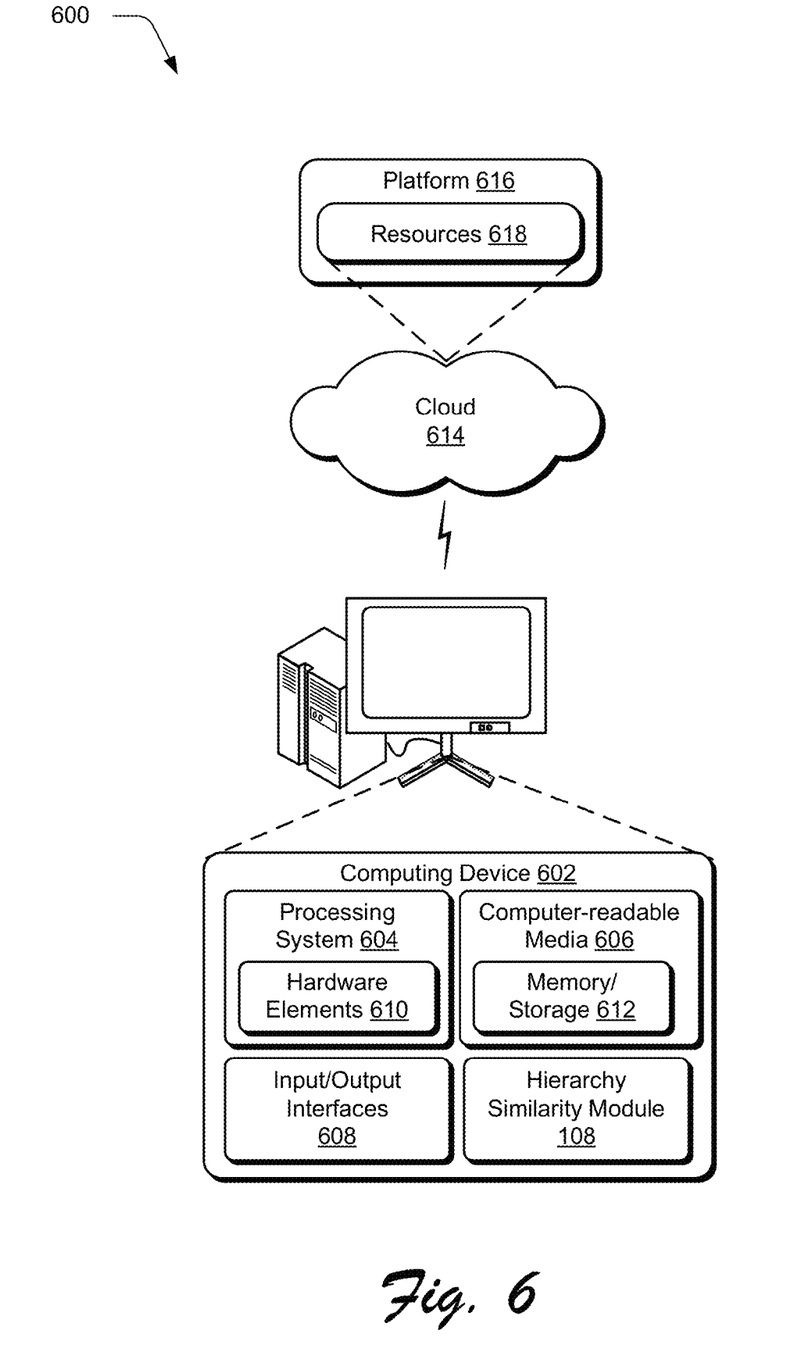
FIG. 6 illustrates an example system including various components of an example device that can be employed for one or more implementations of hierarchy similarity measure techniques described herein.

FIG. 6 illustrates an example system generally at 600 that includes an example computing device 602 that is representative of one or more computing systems and/or devices that may implement the various techniques described herein. This is illustrated through inclusion of the hierarchy similarity module 108, which operates as described above. The computing device 602 may be, for example, a server of a service provider, a device associated with a client (e.g., a client device), an on-chip system, and/or any other suitable computing device or computing system.

The example computing device 602 includes a processing system 604, one or more computer-readable media 606, and one or more I/O interfaces 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware elements 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 606 is illustrated as including memory/storage 612. The memory/storage 612 represents memory/storage capacity associated with one or more computer-readable media. The memory/storage component 612 may include volatile media (such as random access memory (RAM)) and/or nonvolatile media (such as read only memory (ROM), Flash memory, optical disks, magnetic disks, and so forth). The memory/storage component 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that may be employed in some implementations to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of a module that is executable by the computing device 602 as software may be achieved at least partially in hardware, e.g., through use of computer-readable storage media and/or hardware elements 610 of the processing system 604. The instructions and/or functions may be executable/operable by one or more articles of manufacture (for example, one or more computing devices 602 and/or processing systems 604) to implement techniques, modules, and examples described herein.

The techniques described herein may be supported by various configurations of the computing device 602 and are not limited to the specific examples of the techniques described herein. This functionality may also be implemented all or in part through use of a distributed system, such as over a "cloud" 614 via a platform 616 as described below.

The cloud 614 includes and/or is representative of a platform 616 for resources 618. The platform 616 abstracts underlying functionality of hardware (e.g., servers) and software resources of the cloud 614. The resources 618 may include applications and/or data that can be utilized while computer processing is executed on servers that are remote from the computing device 602. Resources 618 can also include services provided over the Internet and/or through a subscriber network, such as a cellular or Wi-Fi network.

The platform 616 may abstract resources and functions to connect the computing device 602 with other computing devices. The platform 616 may also serve to abstract scaling of resources to provide a corresponding level of scale to encountered demand for the resources 618 that are implemented via the platform 616. Accordingly, in an interconnected device implementation, implementation of functionality described herein may be distributed throughout the system 600. For example, the functionality may be implemented in part on the computing device 602 as well as via the platform 616 that abstracts the functionality of the cloud 614.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by one or more computing devices, the method comprising:
    assigning at least one category in a hierarchy of categories to each of at least two objects; and
    computing a similarity score for the at least two objects based on an effect that each category in the hierarchy has on other categories in the hierarchy, the similarity score computed based, at least in part, on:
        a distance factor that is a function of a distance in the hierarchy between the at least one assigned category of the at least two objects; and
        a siblings factor that is a function of a number of siblings in the hierarchy and measures how much the number of siblings of each of the categories affects influence of said category on the other categories in the hierarchy, the siblings factor increasing the influence of the at least one assigned category on ancestor categories when the at least one assigned category has a greater number of siblings.

2. A method as described in claim 1, wherein the distance and the number of siblings that are used to compute the similarity score for the at least two objects are determined individually for each of the at least two objects using a respective said hierarchy.

3. A method as described in claim 1, wherein the assigning the at least one category to each of the at least two objects includes weighting the categories for each said object based on a relevance of the categories to said object.

4. A method as described in claim 1, wherein the computing the similarity score includes computing, for the at least two objects, vectors that represent assignment of the categories in the hierarchy for a respective said object.

5. A method as described in claim 4, wherein the similarity score for the at least two objects is based on applying a cosine similarity technique to the vectors.

6. A method as described in claim 1, wherein the computing the similarity score includes computing, for each of the categories in the hierarchy, vectors that represent the effect that each said category has on the other said categories in the hierarchy based on assignment of the categories in the hierarchy for a respective said object.

7. A method as described in claim 6, wherein the similarity score is based on a weighted sum of the vectors that are computed for the categories in the hierarchy.

8. A method as described in claim 1, further comprising determining the effect that each of the at least one assigned category of the at least two objects has on the other said categories in the hierarchy based, in part, on the distance in the hierarchy between the at least one assigned category.

9. A method as described in claim 1, further comprising determining the effect that each of the at least one assigned category of the at least two objects has on the other said categories in the hierarchy based, in part, on the number of siblings in the hierarchy of the at least one assigned category.

10. A method as described in claim 1, wherein the distance factor measures how much a difference in height between one of the categories and each of the other categories in the hierarchy affects influence of the one category on each of the other categories.

11. A method implemented by one or more computing devices, the method comprising:

forming a first and second hierarchy of categories to represent a respective first and second object, the first and second hierarchy of categories having a same hierarchical structure; and computing a similarity score for the first and second hierarchy of categories based on an effect that each category in the first and second hierarchy has on the other categories in the respective first and second hierarchy, the effect of each category being calculated, in part, using a siblings factor that measures how much a number of siblings of said category affects influence of said category on each of the other categories in the respective first or second hierarchy, the siblings factor, when said category is assigned to the respective first or second object, increasing the influence of said category on ancestor categories when said category has a greater number of siblings.

12. A method as described in claim 11, wherein the effect of each category is calculated, in part, using a distance factor that measures how much a difference in height between said category and each of the other categories in the respective first or second hierarchy affects influence of said category on each of the other categories.

13. A method as described in claim 11, wherein the computing the similarity score includes computing a relevance vector for each of the categories in the first and second hierarchy that represents the effect of said category on the other categories in the respective first or second hierarchy.

14. A method as described in claim 13, wherein the computing the similarity score includes computing a category vector for each of the first and second hierarchy that comprises a weighted sum of the relevance vectors that represent the categories of the respective first or second hierarchy.

15. A method as described in claim 14, wherein the computing the similarity score includes comparing the category vectors for the first and second hierarchy using a vector comparison technique.

16. A method as described in claim 15, wherein the vectors for the first and second hierarchy are compared using a cosine similarity technique.

17. A system comprising:
one or more modules implemented at least partially in hardware, the one or more modules configured to determine a similarity between at least two objects by performing operations comprising:
forming a respective hierarchy of categories to represent each of the at least two objects;
ascertaining an effect that each category in a respective said hierarchy has on the other categories in the respective said hierarchy using:
a distance factor that measures how much a difference in height between said category and each of the other categories affects influence of said category on each of the other categories; and
a siblings factor that measures how much a number of siblings of said category affects influence of said category on each of the other categories, the siblings factor, when said category is assigned to represent one of the at least two objects, causing the influence of said category on ancestor categories to increase for a greater number of siblings of said category;
combining, for each respective said hierarchy, the effects ascertained for the categories of the respective said hierarchy; and
comparing the combined effects of the respective said hierarchies to determine the similarity between the at least two objects.

18. A system as described in claim 17, wherein the respective said hierarchies of categories that are formed to represent each of the at least two objects have a same hierarchical structure.

19. A system as described in claim 17, further comprising computing a relevance vector for each of the categories that represents the effect that each said category is ascertained to have on the other categories in the respective said hierarchy.

20. A system as described in claim 19, wherein:
the combining the effects ascertained for the categories comprises computing, for each respective said hierarchy, a category vector that is a weighted sum of the relevance vectors computed for the categories of the respective said hierarchy; and
the comparing the combined effects of the respective said hierarchies comprises comparing the category vectors for each respective said hierarchy by applying one or more techniques for determining similarity between vectors.

* * * * *